United States Patent
Lin et al.

(10) Patent No.: US 11,729,669 B2
(45) Date of Patent: *Aug. 15, 2023

(54) DATA TRANSMISSION METHOD AND DEVICE

(71) Applicant: GUANGDONG OPPO MOBILE TELECOMMUNICATIONS CORP., LTD., Guangdong (CN)

(72) Inventors: Yanan Lin, Guangdong (CN); Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 120 days.

This patent is subject to a terminal disclaimer.

(21) Appl. No.: 17/357,750

(22) Filed: Jun. 24, 2021

(65) Prior Publication Data

US 2021/0321295 A1  Oct. 14, 2021

Related U.S. Application Data

(63) Continuation of application No. 16/490,349, filed as application No. PCT/CN2017/075655 on Mar. 3, 2017, now Pat. No. 11,071,009.

(51) Int. Cl.
| | | |
|---|---|---|
| *H04W 28/06* | (2009.01) | |
| *H04W 76/11* | (2018.01) | |
| *H04W 76/27* | (2018.01) | |
| *H04W 72/0453* | (2023.01) | |
| *H04W 80/02* | (2009.01) | |

(52) U.S. Cl.
CPC ....... *H04W 28/06* (2013.01); *H04W 72/0453* (2013.01); *H04W 76/11* (2018.02); *H04W 76/27* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 10,986,566 B2* | 4/2021 | Qian | H04W 76/27 |
| 11,071,009 B2* | 7/2021 | Lin | H04W 80/02 |

(Continued)

FOREIGN PATENT DOCUMENTS

| | | |
|---|---|---|
| CN | 102652451 A | 8/2012 |
| CN | 103201977 A | 7/2013 |

(Continued)

OTHER PUBLICATIONS

3GPP TSG RAN WG2 #67bis; R2-095671; Miyazaki, Japan, Oct. 12-16, 2009; "Mapping of logical channels to component carriers"; pp. 1-9.

(Continued)

*Primary Examiner* — Hassan A Phillips
*Assistant Examiner* — Gautam Sharma
(74) *Attorney, Agent, or Firm* — Young Basile Hanlon & MacFarlane, P.C.

(57) ABSTRACT

Described herein are a method and device for transmitting data. The method includes: determining a plurality of carriers or carrier groups for transmitting duplicated data according to a plurality of logical channels for carrying the duplicated data, wherein at least two logical channels in the plurality of logical channels correspond to different carriers or carrier groups for transmitting the duplicated data; transmitting the duplicated data carried in the plurality of logical channels respectively on the plurality of carriers or carrier groups; wherein in the plurality of logical channels, different logical channels correspond to different media access control (MAC) entities; wherein at least two logical channels in the plurality of logical channels corresponding to different carriers or carrier groups for transmitting the duplicated data comprises: in the MAC entities corresponding to the plurality of logical channels, different MAC entities correspond to different carriers or carrier groups.

16 Claims, 3 Drawing Sheets

(56) References Cited

U.S. PATENT DOCUMENTS

| | | | |
|---|---|---|---|
| 2010/0067489 A1* | 3/2010 | Pelletier | H04W 48/17 370/392 |
| 2011/0038333 A1 | 2/2011 | Yi et al. | |
| 2011/0170495 A1 | 7/2011 | Earnshaw et al. | |
| 2012/0057560 A1 | 3/2012 | Park et al. | |
| 2012/0076126 A1 | 3/2012 | Yi et al. | |
| 2015/0181638 A1* | 6/2015 | Tabet | H04W 76/15 370/329 |
| 2015/0215987 A1 | 7/2015 | Kim et al. | |
| 2016/0269982 A1* | 9/2016 | Larsson | H04W 48/16 |
| 2016/0309389 A1* | 10/2016 | Laraqui | H04W 76/12 |
| 2018/0098250 A1* | 4/2018 | Vrzic | H04W 36/0016 |
| 2018/0270021 A1* | 9/2018 | Ye | H04L 5/0044 |
| 2018/0279168 A1* | 9/2018 | Jheng | H04L 5/001 |
| 2018/0288631 A1* | 10/2018 | Wei | H04W 24/02 |
| 2018/0324642 A1* | 11/2018 | Yu | H04L 5/0053 |
| 2018/0332501 A1* | 11/2018 | Tseng | H04L 1/08 |
| 2018/0367288 A1* | 12/2018 | Vrzic | H04W 36/22 |
| 2018/0367463 A1* | 12/2018 | Jose | H04L 47/32 |
| 2018/0368107 A1* | 12/2018 | Babaei | H04L 1/1838 |
| 2019/0386779 A1* | 12/2019 | Hong | H04L 5/001 |
| 2019/0394826 A1* | 12/2019 | Wang | H04W 76/19 |
| 2020/0007281 A1* | 1/2020 | Kilinc | H04W 76/15 |
| 2020/0314690 A1* | 10/2020 | Kim | H04W 4/70 |

FOREIGN PATENT DOCUMENTS

| | | |
|---|---|---|
| CN | 105432028 A | 3/2016 |
| CN | 105790889 A | 7/2016 |
| EP | 2343945 A2 | 7/2011 |
| EP | 2547017 A2 | 1/2013 |
| KR | 20160074477 A | 6/2016 |
| RU | 2421910 C2 | 6/2011 |
| WO | 2013009635 A2 | 1/2013 |
| WO | 2014054568 A1 | 4/2014 |
| WO | 2015115854 A1 | 8/2015 |
| WO | 2018156074 A1 | 8/2018 |

OTHER PUBLICATIONS

Extended EP Search Report for EP Application No. OPPO5-181-A dated Jan. 17, 2020.
3GPP TSG-RAN WG2 Meeting #97; Athens, Greece, Feb. 13-17, 2017; R2-701186.
English Translation of Russian Notice of Allowance for Russian Application No. 2019131068/07(061008) dated Jul. 15, 2020.
3GPP TSG-RAN WG2 #97; Tdoc R2-1700833; Athens, Greece, Feb. 13-17, 2017; Data duplication in lower layers (HARQ); pp. 1-4.
3GPP TSG-RAN WG2 #97; Tdoc R2-1700865; Athens, Greece, Jan. 13-17, 2017; RLC ARQ vs. PDCP data recovery during mobility; pp. 1-4.
First Chile Office Action and English Translation for Chile Application No. 2019-002500 dated Sep. 17, 2020.
3GPP TSG-RAN2 Meeting #97; R2-1701201; Athens, Greece, Feb. 13-17, 2017; Redundancy Schemes below PDCP Layer; pp. 1-4.
3GPP TSG-RAN WG2 #97; Tdoc R2-1702032; Athens, Greece, Feb. 13-17, 2017; Revision of R2-1700833; Data duplication in lower layers (HARQ); pp. 1-6.
Canadian First Examination Report dated Nov. 6, 2020.
Chinese First Office Action and English Translation dated Nov. 2, 2020.
Singapore Notice of Allowance dated Nov. 17, 2020.
Extended European Search Report for EP Application 21154530.6 dated Apr. 20, 2021. (8 pages).
India Examination Report for IN Application 201917035273 dated Feb. 24, 2021. (6 pages).
Japanese Office Action with English Translation for JP Application 2019-547471 dated Mar. 3, 2021. (8 pages).
Korean Office Action with English Translation for KR Application 10-2019-7025780 dated Mar. 19, 2021. (8 pages).
Taiwan First Office Action with English Translation for TW Application 107106890 dated Mar. 31, 2021. (9 pages).
International Search Report with English Translation for PCT/CN2017/075655 dated Nov. 30, 2017.
Canadian Examination Report for CA Application 3055098 dated Oct. 19, 2021. (3 pages).
Australian Examination Report for AU Application 2017401979 dated Oct. 25, 2021. (3 pages).
Indonesia Office Action with English Translation for ID Application P00201908477 dated Dec. 16, 2021. (10 pages).
Mexican First Substantive Examination requirement is reported with English Translation for MX Application MXa2019010414 dated Oct. 18, 2022. (6 pages).

* cited by examiner

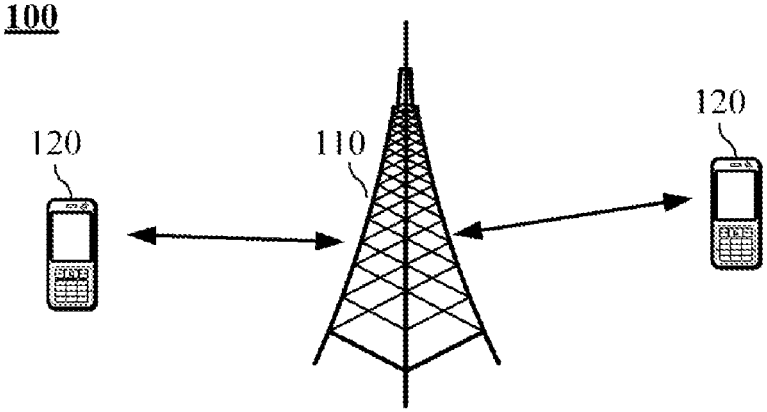

Determine a plurality of carriers or carrier groups for transmitting duplicated data according to a plurality of logical channels for bearing the duplicated data. Herein at least two logical channels in the plurality of logical channels correspond to different carriers or carrier groups for transmitting the duplicated data — S210

Transmit the duplicated data borne in the plurality of logical channels respectively by using the plurality of carriers or carrier groups — S220

FIG. 2

DATA TRANSMISSION METHOD AND DEVICE

CROSS-REFERENCE TO RELATED APPLICATION(S)

This application is a continuation application of U.S. application Ser. No. 16/490,349 filed on Aug. 30, 2019, which is a 371 application of International Application No. PCT/CN 2017/075655 filed on Mar. 3, 2017, the entire disclosures of both applications are hereby incorporated by reference.

TECHNICAL FIELD

Implementations of the present disclosure relate to the field of communication, and more particularly, relate to a method and device for transmitting data.

BACKGROUND

In a Carrier Aggregation scenario, data duplication function of a Packet Data Convergence Protocol (PDCP) may be used for transmitting repeated data, thus improving reliability of data transmission. Specifically, a PDCP layer firstly performs data replication to obtain a plurality of PDCP protocol data units (PDUs), maps the plurality of PDCP PDUs to different Radio Link Control (RLC) entities respectively, and a RLC layer may carry the plurality of PDCP PDUs through different logical channels. However, to a Media Access Control (MAC) layer, it is not known which logical channels transmit the same data. Therefore, the MAC layer cannot effectively schedule the data in the logical channels carrying duplicated PDCP PDUs, and thus frequency diversity gain cannot be obtained.

SUMMARY

The implementations of the present disclosure provide a method and device for transmitting data.

In a first aspect, there is provided a method for transmitting data, including: determining a plurality of carriers or carrier groups for transmitting duplicated data according to a plurality of logical channels for carrying the duplicated data, wherein at least two logical channels in the plurality of logical channels correspond to different carriers or carrier groups for transmitting the duplicated data; and transmitting the duplicated data carried in the plurality of logical channels respectively by using the plurality of carriers or carrier groups.

Optionally, logical channels and carriers or carrier groups may have a correspondence relationship, so that the device for transmitting data may determine a corresponding plurality of carriers or carrier groups according to a plurality of logical channels carrying the duplicated data and the correspondence relationship. Optionally, the correspondence relationship may be agreed in a protocol, or if the device for transmitting data is a terminal device, the correspondence relationship may be sent to the terminal device by a network device through a high level signaling.

In combination with the first aspect, in some implementations of the first aspect, the determining the plurality of carriers or carrier groups for transmitting duplicated data according to the plurality of logical channels for carrying the duplicated data, includes: determining the plurality of carriers or carrier groups according to respective indication information of each of the plurality of logical channels.

In combination with the first aspect, in some implementations of the first aspect, the respective indication information of each logical channel is included in an indication field of respective logical channel configuration information of the each logical channel.

Optionally, an indication field may be added in the logical channel configuration information corresponding to each logical channel to carry the indication information, or the original indication field may be multiplexed to carry the indication information, or a reserved field in the logical channel configuration information may be used for carrying the indication information.

Optionally, the respective indication information corresponding to each logical channel may be included in other attribute information of the each logical channel.

In combination with the first aspect, in some implementations of the first aspect, the logical channel configuration information corresponding to each logical channel is a radio resource control (RRC) information element of the each logical channel, and the RRC information element of the each logical channel is used for configuring channel parameters of the each logical channel.

In combination with the first aspect, in some implementations of the first aspect, the indication information includes first indication information corresponding to a first logical channel of the plurality of logical channels, the first indication information is used for indicating a carrier identity (ID) of one carrier or a group of carriers, and the determining the plurality of carriers or carrier groups according to the respective indication information of each of the plurality of logical channels, includes: determining that a first carrier corresponding to a carrier ID of one carrier or a first carrier group corresponding to a carrier ID of a group of carriers indicated by the first indication information is a carrier or a carrier group for transmitting the duplicated data carried in the first logical channel; the transmitting the duplicated data carried in the plurality of logical channels respectively by using the plurality of carriers or carrier groups, includes: transmitting the duplicated data carried in the first logical channel by using the first carrier or part or all of carriers in the first carrier group.

Optionally, in the implementation of the present disclosure, the respective indication information corresponding to each of the plurality of logical channels may all indicate a carrier ID of one carrier, or may all indicate a carrier ID of a group of carriers, or respective indication information corresponding to some logical channels indicates a carrier ID of one carrier respectively, while respective indication information corresponding to other logical channels indicates a carrier ID of a group of carriers respectively. In this case, it is only required that the carriers or carrier groups indicated by the respective indication information corresponding to at least two logical channels in the plurality of logical channels are different, so that the device for transmitting data may schedule the duplicated data to be transmitted on different carriers or carrier groups.

In combination with the first aspect, in some implementations of the first aspect, the indication information includes second indication information corresponding to a second logical channel of the plurality of logical channels, the second indication information is identity information of other logical channels than the second logical channel in the plurality of logical channels, and the determining the plurality of carriers or carrier groups according to the respective indication information corresponding to each logical channel of the plurality of logical channels, includes: determining that the duplicated data carried in the second logical channel and the other logical channels respectively correspond to different carriers or carrier groups according to the second indication information; the transmitting the duplicated data carried in the plurality of logical channels respectively by using the plurality of carriers or carrier groups, includes: transmitting the duplicated data carried in the second logical channel and the other logical channels respectively by using the different carriers or carrier groups.

That is, respective indication information corresponding to each logical channel may directly indicate a carrier or carrier group used for transmitting duplicated data carried in the each logical channel, so that the device for transmitting data may directly schedule the duplicated data carried in each logical channel according to the carrier or carrier group indicated by the indication information of the each logical channel. Or, the respective indication information corresponding to each logical channel may indicate identity information of a logical channel that transmits duplicated data together with the each logical channel, so that the device for transmitting data may determine which different carriers or carrier groups to schedule the duplicated data carried in each logical channel for transmission at a MAC layer.

In combination with the first aspect, in some implementations of the first aspect, the indication information includes third indication information corresponding to a third logical channel of the plurality of logical channels, the third indication information is used for indicating whether the duplicated data is carried in the third logical channel, and the determining the plurality of carriers or carrier groups according to the respective indication information corresponding to each logical channel of the plurality of logical channels, includes: determining that the duplicated data carried in the third logical channel and a fourth logical channel respectively correspond to different carriers or carrier groups if the third indication information indicates that the duplicated data is carried and fourth indication information corresponding to the fourth logical channel indicates that the duplicated data is carried; the transmitting the duplicated data carried in the plurality of logical channels respectively by using the plurality of carriers or carrier groups, includes: transmitting the duplicated data carried in the third logical channel and the fourth logical channel respectively by using the different carriers or carrier groups.

In combination with the first aspect, in some implementations of the first aspect, before the determining the plurality of carriers or carrier groups according to respective indication information of each of the plurality of logical channels, the method further includes: determining that there is an indication field including the indication information in logical channel configuration information of the each logical channel.

In combination with the first aspect, in some implementations of the first aspect, the determining the plurality of carriers or carrier groups for transmitting the duplicated data according to the plurality of logical channels for carrying the duplicated data, includes: determining a plurality of media access control (MAC) entities according to the plurality of logical channels and a first correspondence relationship, wherein the first correspondence relationship is a correspondence relationship between logical channels and MAC entities, and the plurality of logical channels and the plurality of MAC entities correspond one to one; determining the plurality of carriers or carrier groups according to the plurality of MAC entities and a second correspondence relationship, wherein the second correspondence relationship is a correspondence relationship between MAC entities and carriers or carrier groups, and the plurality of MAC entities and the plurality of carriers or carrier groups correspond one to one.

Optionally, the first correspondence relationship may be a one-to-one correspondence relationship, i.e., logical channels and MAC entities correspond one to one, so the device for transmitting data may determine a plurality of MAC entities according to the plurality of logical channels and the first correspondence relationship.

Optionally, the second correspondence relationship may be a one-to-one correspondence relationship or a one-to-many correspondence relationship, i.e., one MAC entity may correspond to one carrier or a carrier group, or one MAC entity may correspond to a plurality of carriers or carrier groups. Therefore, the device for transmitting data may determine a plurality of carriers or carrier groups according to the plurality of MAC entities and the second correspondence relationship, and then the device for transmitting data may transmit duplicated data carried in the plurality of logical channels through the plurality of carriers or carrier groups.

In combination with the first aspect, in some implementations of the first aspect, the first correspondence relationship is preconfigured by a high layer signaling.

Optionally, if the device for transmitting data is a terminal device, the first correspondence relationship may be preconfigured to the terminal device by a network device through a high level signaling, or the first correspondence relationship may be agreed between the terminal device and the network device, or the first correspondence relationship may be specified in a protocol. If the device for transmitting data is a network device, the first correspondence relationship may be preconfigured by the network device, or agreed between the network device and the terminal device, or the first correspondence relationship may be specified in a protocol.

In combination with the first aspect, in some implementations of the first aspect, the duplicated data is duplicated data obtained by duplicating the same packet data convergence protocol (PDCP) protocol data unit (PDU) by a PDCP split carrier.

In combination with the first aspect, in some implementations of the first aspect, carrying the duplicated data on the plurality of logical channels is preconfigured by a higher layer signaling.

That is to say, which logical channels are to be used for transmitting duplicated data may be preconfigured through a high layer signaling, and when there is data transmission on these logical channels, the data transmitted on these logical channels may be considered as duplicated data. Optionally, the high layer signaling is an RRC signaling.

In combination with the first aspect, in some implementations of the first aspect, the high layer signaling is a radio resource control (RRC) signaling.

In a second aspect, there is provided a device for transmitting data, including units for performing the method in the first aspect or various implementations thereof.

In a third aspect, a device for transmitting data is provided, which includes a memory for storing a program, a transceiver, and a processor for executing the program, and when executing the program, the processor executes the method of the first aspect based on the transceiver.

In a fourth aspect, a computer readable medium is provided, which stores program codes for execution by a terminal device, wherein, the program codes include instructions for executing the method in the first aspect.

BRIEF DESCRIPTION OF DRAWINGS

FIG. 1 is a schematic diagram of a wireless communication system according to an implementation of the present disclosure.

FIG. 2 is a schematic flowchart of a method for transmitting data according to an implementation of the present disclosure.

DETAILED DESCRIPTION

Figure 3:
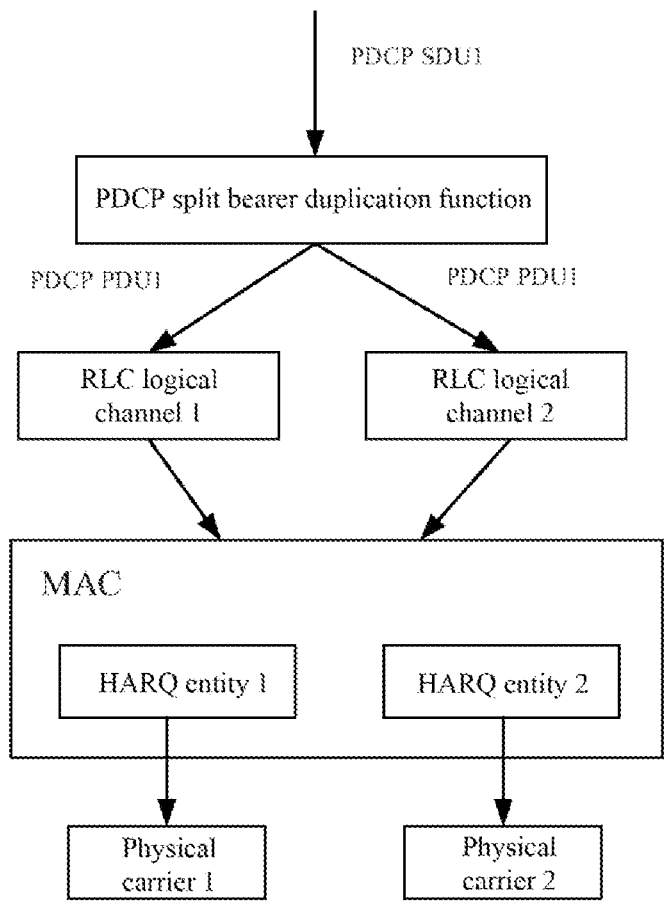
FIG. 3 is a schematic diagram of an example of a method for transmitting data according to an implementation of the present disclosure.

The technical solutions in implementations of the present disclosure will be described below with reference to the drawings in the implementations of the present disclosure.

The technical solutions of the implementations of the present disclosure may be applied to various communication systems, such as a Global System of Mobile communication (GSM), a Code Division A plurality of Access (CDMA) system, a Wideband Code Division A plurality of Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a future 5G system.

FIG. 1 shows a wireless communication system 100 to which an implementation of the present disclosure is applied. The wireless communication system 100 may include a network device 110. The network device 100 may be a device that communicates with a terminal device. The network device 100 may provide communication coverage for a specific geographical area and may communicate with terminal devices (e.g., UEs) located within the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or, the network device may be a relay station, an access point, an on-board device, or a wearable device, a network side device in a future 5G network, or a network device in a future evolved Public Land Mobile Network (PLMN), etc.

The wireless communication system 100 further includes at least one terminal device 120 located within the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user equipment. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, an on-board device, a wearable device, a terminal device in a future 5G network, or a terminal device in a future evolved PLMN, or the like.

Optionally, the 5G system or network may also be referred to as a New Radio (NR) system or network.

FIG. 1 exemplifies one network device and two terminal devices. Optionally, the wireless communication system 100 may include a plurality of network devices and other quantities of terminal devices may be included within a coverage area of each network device. The implementations of the present disclosure are not limited thereto.

Optionally, the wireless communication system 100 may further include other network entities such as a network controller, and a mobility management entity. The implementations of the present disclosure are not limited thereto.

It should be understood that the terms "system" and "network" are often used interchangeably herein. The term "and/or" in this document is merely an association relationship describing associated objects, indicating that there may be three relationships, for example, A and/or B may indicate three situations: A alone, A and B, and B alone. In addition, the character "/" in this document generally indicates that the objects before and after the character have an "or" relationship.

In the prior art, in order to provide reliability of transmission, a PDCP layer may duplicate data. Specifically, a PDCP split carrier duplication function of the PDCP layer may duplicate a PDCP Service Data Unit (SDU) to obtain a plurality of PDCP PDUs, the plurality of PDCP PDUs have the same payload and the same header, and each PDCP PDU may be referred to as a duplicated data. The plurality of PDCP PDUs may be carried through a plurality of logical channels, but a MAC layer does not know that the data transmitted through the plurality of logical channels are duplicated data, that is, the same data, so when data are scheduled, the MAC layer would not consider scheduling the data in the plurality of logical channels to different carriers for transmission, and therefore, frequency diversity gain cannot be obtained.

In view of this, the implementation of the present disclosure provides a method for transmitting data, which may schedule duplicated data transmitted through a plurality of logical channels to at least two different carriers for transmission, thereby obtaining the frequency diversity gain and further improving the reliability for transmitting data.

FIG. 2 is a schematic flowchart of a method 200 for transmitting data according to an implementation of the present disclosure. The method 200 may be performed by the terminal device 120 or the network device 110 in the communication system 100 described in FIG. 1. As shown in FIG. 2, the method 200 includes acts S210-220.

In S210, a plurality of carriers or carrier groups for transmitting duplicated data is determined according to a plurality of logical channels for carrying the duplicated data. Herein at least two logical channels in the plurality of logical channels correspond to different carriers or carrier groups for transmitting the duplicated data.

In S220, the duplicated data carried in the plurality of logical channels are transmitted respectively by using the plurality of carriers or carrier groups.

The method 200 of the implementation of the present disclosure will be described below with a device for transmitting data being an executing body, and the device for transmitting data may be a terminal device or a network device.

Therefore, in the implementation of the present disclosure, the device for transmitting data may determine a plurality of carriers or carrier groups according to a plurality of logical channels carrying duplicated data. Herein at least two logical channels in the plurality of logical channels correspond to different carriers or carrier groups for transmitting the duplicated data, so that the duplicated data may be transmitted through at least two different carriers or carrier groups, thereby obtaining the frequency diversity gain and further improving the reliability of transmission.

Specifically, the device for transmitting data may generate a plurality of duplicated data at a PDCP layer, the plurality of duplicated data are the same, and the plurality of duplicated data may be transmitted through a plurality of logical channels, that is, each logical channel may carry one duplicated data. The device for transmitting data may determine a plurality of carriers or carrier groups according to the plurality of logical channels. In one possible implementation, logical channels and carriers or carrier groups may have a correspondence relationship, so that the device for transmitting data may determine a corresponding plurality of carriers or carrier groups according to a plurality of logical channels carrying the duplicated data and the correspondence relationship. Optionally, the correspondence relationship may be agreed in a protocol, or if the device for transmitting data is a terminal device, the correspondence relationship may be sent to the terminal device by a network device through a high level signaling, and optionally, the high level signaling may be a Radio Resource Control (RRC) signaling.

Optionally, in some implementations, logical channels may have a correspondence relationship with MAC entities. For example, different logical channels may correspond to different MAC entities, and different MAC entities may correspond to different physical layer carriers or carrier groups, so that the device for transmitting data may determine a plurality of MAC entities corresponding to the plurality of logical channels according to the plurality of logical channels carrying the duplicated data and the correspondence relationship between the logical channels and the MAC entities, and further determine a plurality of carriers or carrier groups corresponding to the plurality of MAC entities. Since carriers or carrier groups corresponding to different MAC entities are different, the plurality of carriers or carrier groups are different. Optionally, the correspondence relationship between the logical channels and the MAC entities may be agreed in a protocol, or if the device for transmitting data is a terminal device, the correspondence relationship may be configured by a network device to the terminal device through a high level signaling, and optionally, the high level signaling may be an RRC signaling.

Optionally, the device for transmitting data may determine a plurality of carriers or carrier groups according to indication information corresponding to the plurality of logical channels. For example, the indication information may directly indicate the identities (IDs) of the carriers or carrier groups used for transmitting the duplicated data in the corresponding logical channels, so the device for transmitting data may determine an ID of a carrier or carrier group indicated by each piece of indication information according to the respective indication information corresponding to each logical channel after acquiring the duplicated data in the each logical channel at a MAC layer. Optionally, indication information corresponding to a first logical channel of the plurality of logical channels may indicate identity information of other logical channels than the first logical channel in the plurality of logical channels, so that the device for transmitting data may determine other logical channels that transmit duplicated data together with the first logical channel according to the indication information corresponding to the first logical channel, so that when the device for transmitting data schedules data at a MAC layer, duplicated data carried in the first logical channel and the other logical channels may be scheduled to be transmitted on different carriers or carrier groups, so that the frequency diversity gain may be obtained, and the reliability of transmission may be further improved.

Optionally, in some implementations, the act of determining the plurality of carriers or carrier groups for transmitting the duplicated data according to the plurality of logical channels for carrying the duplicated data includes: determining the plurality of carriers or carrier groups according to respective indication information of each of the plurality of logical channels.

Specifically, a plurality of logical channels for carrying duplicated data may all correspond to corresponding indication information, and the device for transmitting data may determine a plurality of carriers or carrier groups for transmitting duplicated data carried in the plurality of logical channels according to the indication information. Optionally, the respective indication information corresponding to each logical channel may be included in logical channel configuration (LogicalChannelConfig) information corresponding to the each logical channel. Specifically, the logical channel configuration information corresponding to each logical channel may be an RRC Information Element of the each logical channel, and the RRC information element is used for configuring channel parameters of the each logical channel, such as information of a logical channel scheduling priority, and a logical channel group to which it belongs.

Optionally, a new indication field may be added in the logical channel configuration information corresponding to each logical channel to carry the indication information, or the original indication field may be multiplexed to carry the indication information, or a reserved field in the logical channel configuration information may be used for carrying the indication information. Optionally, the respective indication information corresponding to each logical channel may be included in other attribute information of the each logical channel, which is not limited by the implementation of the present disclosure.

Optionally, as one implementation, the indication information includes first indication information corresponding to a first logical channel of the plurality of logical channels, the first indication information is used for indicating a carrier identity (ID) of one carrier or a group of carriers, and the determining the plurality of carriers or carrier groups according to the respective indication information corresponding to each logical channel of the plurality of logical channels, includes: determining that a first carrier corresponding to a carrier ID of one carrier or a first carrier group corresponding to a carrier ID of a group of carriers indicated by the first indication information is a carrier or a carrier group for transmitting the duplicated data carried in the first logical channel; the transmitting the duplicated data carried in the plurality of logical channels respectively by using the plurality of carriers or carrier groups, includes: transmitting the duplicated data carried in the first logical channel by using the first carrier or part or all of carriers in the first carrier group.

Specifically, the indication information of each logical channel may indicate an ID of a carrier or carrier group used for transmitting duplicated data carried in the each logical channel. For example, the plurality of logical channels include a first logical channel, and indication information corresponding to the first logical channel is denoted as first indication information for convenience of distinction and description, and the first indication information may indicate a carrier ID of one carrier or a group of carriers. That is to say, the first indication information may indicate the carrier ID of one or more carriers, and a carrier or carrier group corresponding to the carrier ID of the one or group of carriers may be used for transmitting duplicated data carried in the first logical channel. That is, the carrier or carrier group for transmitting the duplicated data carried in each logical channel may be indicated by the respective indication information corresponding to the each logical channel. Therefore, the device for transmitting data may schedule the duplicated data carried in the plurality of logical channels to be transmitted on at least two different carriers or carrier groups by configuring carriers or carrier groups corresponding to at least two logical channels for transmitting the duplicated data to be different, that is, carriers or carrier groups indicated by the respective indication information corresponding to at least two logical channels are different. For example, the plurality of logical channels include logical channel 1 and logical channel 2, respectively corresponding to indication information 1 and indication information 2. The indication information 1 indicates carrier ID1, and carrier ID1 corresponds to carrier 1. The indication information 2 indicates carrier ID2, and carrier ID2 corresponds to carrier 2. Then duplicated data carried in logical channel 1 and logical channel 2 may be transmitted through carrier 1 and carrier 2, respectively. Therefore, the device for transmitting data may transmit duplicated data through different carriers, thereby obtaining the frequency diversity gain and further improving the reliability of transmitting data.

Therefore, the device for transmitting data may determine a carrier or carrier group for transmitting duplicated data carried in each logical channel according to indication information corresponding to the each logical channel, so that the duplicated data carried in each logical channel may be transmitted on the carrier or carrier group for transmitting the duplicated data corresponding to the each logical channel. Specifically, if the plurality of logical channels include a first logical channel, first indication information corresponding to the first logical channel indicates a carrier ID of one carrier, and the device for transmitting data may transmit duplicated data carried in the first logical channel by using a carrier corresponding to the carrier ID indicated by the first indication information, or if the first indication information indicates a carrier ID of a group of carriers, the device for transmitting data may transmit duplicated data carried in the first logical channel by using part or all of carriers in a first carrier group corresponding to the carrier ID of the group of carriers. It should be understood that in the implementation of the present disclosure, a carrier ID of a group of carriers may be a group ID of one carrier group, or may be carrier IDs of a plurality of carriers, which is not limited in the implementation of the present disclosure.

It should be understood that in the implementation of the present disclosure, the respective indication information corresponding to each of the plurality of logical channels may all indicate a carrier ID of one carrier, or may all indicate a carrier ID of a group of carriers, or indication information corresponding to some logical channels indicates a carrier ID of one carrier, while indication information corresponding to other logical channels indicates a carrier ID of a group of carriers. In this case, it is only required that the carriers or carrier groups indicated by the indication information corresponding to at least two logical channels in the plurality of logical channels are different, so that the device for transmitting data may schedule the duplicated data to be transmitted on different carriers or carrier groups.

Optionally, in some implementations, the indication information includes second indication information corresponding to a second logical channel of the plurality of logical channels, the second indication information is identity information of other logical channels than the second logical channel in the plurality of logical channels, and the act of determining the plurality of carriers or carrier groups according to the respective indication information corresponding to each logical channel of the plurality of logical channels includes: determining that the duplicated data carried in the second logical channel and the other logical channels respectively correspond to different carriers or carrier groups according to the second indication information. The act of transmitting the duplicated data carried in the plurality of logical channels respectively by using the plurality of carriers or carrier groups includes: transmitting the duplicated data carried in the second logical channel and the other logical channels respectively by using the different carriers or carrier groups.

Specifically, the plurality of logical channels may include a second logical channel, and indication information corresponding to the second logical channel is denoted as second indication information for convenience of distinction and description, and the second indication information may indicate identity information of other logical channels than the second logical channel in the plurality of logical channels. Therefore, the device for transmitting data may determine, according to the second indication information, which logical channels are used for transmitting duplicated data, then the duplicated data carried in these logical channels may be scheduled to be transmitted on different carriers in a MAC layer, so that the frequency diversity gain may be obtained, and the reliability of transmitting data is further improved. For example, the plurality of logical channels include logical channel 1 and logical channel 2, and corresponding logical channels are identified as LC1 and LC2 respectively, then indication information corresponding to logical channel 1 may indicate LC2, and indication information corresponding to logical channel 2 may indicate LC1, so that the device for transmitting data may know that the two logical channels are used for transmitting duplicated data, and then duplicated data in the two logical channels may be scheduled to be transmitted on different carriers, so that the frequency diversity gain may be obtained, and the reliability of transmission is further improved.

That is, respective indication information corresponding to each logical channel may directly indicate a carrier or carrier group used for transmitting duplicated data carried in the each logical channel, so that the device for transmitting data may directly schedule the duplicated data carried in each logical channel according to the carrier or carrier group indicated by the indication information of the each logical channel. Or the respective indication information corresponding to each logical channel may indicate identity information of a logical channel that transmits duplicated data together with the each logical channel, so that the device for transmitting data may determine which different carriers or carrier groups to schedule the duplicated data carried in each logical channel for transmission at a MAC layer.

Optionally, in some implementations, the indication information includes third indication information corresponding to a third logical channel of the plurality of logical channels, the third indication information is used for indicating whether the duplicated data is carried in the third logical channel, and the determining the plurality of carriers or carrier groups according to the respective indication information corresponding to each logical channel of the plurality of logical channels, includes: determining that the duplicated data carried in the third logical channel and a fourth logical channel respectively correspond to different carriers or carrier groups if the third indication information indicates that the duplicated data is carried and fourth indication information corresponding to the fourth logical channel indicates that the duplicated data is carried; the transmitting the duplicated data carried in the plurality of logical channels respectively by using the plurality of carriers or carrier groups, includes: transmitting the duplicated data carried in the third logical channel and the fourth logical channel respectively by using the different carriers or carrier groups.

Specifically, the plurality of logical channels may include a third logical channel, indication information corresponding to the third logical channel is denoted as third indication information for convenience of distinction and description, the third indication information may indicate whether the third logical channel carries the duplicated data, indication information corresponding to a fourth logical channel may also indicate whether the fourth logical channel carries the duplicated data. If the device for transmitting data determines that the third indication information indicates that the duplicated data is carried, and the indication information corresponding to the fourth logical channel also indicates that the duplicated data is carried, the device for transmitting data may schedule the duplicated data carried in the third logical channel and the fourth logical channel to be transmitted on different carriers, thus obtaining the frequency diversity gain and further improving the reliability of transmission.

Optionally, in some implementations, before the determining the plurality of carriers or carrier groups according to respective indication information of each of the plurality of logical channels, the method further includes: determining that there is an indication field including the indication information in logical channel configuration information of the each logical channel.

Specifically, in a MAC layer, the device for transmitting data may firstly determine whether there is an indication field for carrying the indication information in the logical channel configuration information corresponding to each logical channel. If there is the indication field, the device for transmitting data may schedule duplicated data carried in the plurality of logical channels to different carriers or carrier groups for transmission according to the method described in the above implementation, otherwise, the device for transmitting data may schedule the data carried in the plurality of logical channels according to a scheduling method in the prior art.

Optionally, in some implementations, the determining the plurality of carriers or carrier groups for transmitting the duplicated data according to the plurality of logical channels for carrying the duplicated data, includes: determining a plurality of media access control (MAC) entities according to the plurality of logical channels and a first correspondence relationship, wherein the first correspondence relationship is a correspondence relationship between logical channels and MAC entities, and the plurality of logical channels and the plurality of MAC entities correspond one to one; determining the plurality of carriers or carrier groups according to the plurality of MAC entities and a second correspondence relationship, wherein the second correspondence relationship is a correspondence relationship between MAC entities and carriers or carrier groups, and the plurality of MAC entities and the plurality of carriers or carrier groups correspond one to one.

Specifically, the logical channels and the MAC entities may have a first correspondence relationship, and the first correspondence relationship may be a one-to-one correspondence relationship, i.e., the logical channels and the MAC entities are one-to-one corresponding, therefore, the device for transmitting data may determine a plurality of MAC entities according to the plurality of logical channels and the first correspondence relationship. Different MAC entities correspond to different carriers or carrier groups, that is, MAC entities and carriers or carrier groups may have a second correspondence relationship, which may be a one-to-one correspondence relationship or a one-to-many correspondence relationship, that is, one MAC entity may correspond to one carrier or carrier group, or one MAC entity may correspond to a plurality of carriers or carrier groups. Therefore, the device for transmitting data may determine a plurality of carriers or carrier groups according to the plurality of MAC entities and the second correspondence relationship, and then the device for transmitting data may transmit duplicated data carried in the plurality of logical channels through the plurality of carriers or carrier groups.

Optionally, in some implementations, the first correspondence relationship is preconfigured by a high layer signaling.

Specifically, if the device for transmitting data is a terminal device, the first correspondence relationship may be preconfigured to the terminal device by a network device through a high level signaling, or the first correspondence relationship may be agreed between the terminal device and the network device, or the first correspondence relationship may be specified in a protocol. If the device for transmitting data is a network device, the first correspondence relationship may be preconfigured by the network device, or agreed between the network device and the terminal device, or the first correspondence relationship may be specified in a protocol.

Optionally, in the implementation of the present disclosure, the duplicated data is duplicated data obtained by duplicating the same packet data convergence protocol (PDCP) protocol data unit (PDU) by a PDCP split carrier.

In other words, the duplicated data may be a plurality of duplicated PDCP PDUs that a PDCP split carrier duplicates the same PDCP PDU to be, each of the plurality of duplicated PDCP PDUs may be referred to as a duplicated data, and each duplicated PDCP PDU has the same content, i.e., the same payload and header. In a RLC layer, the plurality of duplicated data are mapped onto a plurality of logical channels, that is, the plurality of duplicated data are respectively transmitted through the plurality of logical channels.

Optionally, in some implementations, carrying the duplicated data on the plurality of logical channels is preconfigured by a higher layer signaling.

That is to say, which logical channels are to be used for transmitting duplicated data may be preconfigured through a high layer signaling, and when there is data transmission on these logical channels, the data transmitted on these logical channels may be considered as duplicated data. Optionally, the high layer signaling is an RRC signaling.

The method for transmitting data according to the implementation of the present disclosure will be described with reference to a specific example below. As shown in FIG. 3, a PDCP split carrier duplication function module of a PDCP layer may duplicate PDCP SDU1 into two PDCP PDU1s, the two PDCP PDU1s include the same data and header. In a RLC layer, the two PDCP PDU1s are respectively mapped to RLC logical channel 1 and RLC logical channel 2. In one possible implementation, RRC information element of LogicalChannelConfig of each logical channel includes indication information indicating a carrier ID. For example, indication information corresponding to the RLC logical channel 1 indicates a carrier ID1 corresponding to carrier 1, the carrier 1 corresponds to HARQ entity 1 of a MAC layer, and indication information corresponding to the RLC logical channel 2 indicates a carrier ID2 corresponding to a carrier 2, and the carrier 2 corresponds to HARQ entity 2 of the MAC layer. Therefore, the device for transmitting data may schedule the two PDCP PDU1s to be transmitted on the carrier 1 and carrier 2. As another example, the indication information corresponding to the RLC logical channel 1 indicates carrier ID1, carrier ID2, and carrier ID3, respectively corresponding to carrier 1, carrier 2, and carrier 3, and the indication information corresponding to the RLC logical channel 2 indicates carrier ID4, carrier ID5, and carrier ID6, corresponding to carrier 4, carrier 5, and carrier 6. Therefore, the device for transmitting data may select a carrier for transmitting PDCP PDU1 in the RLC logical channel 1 among carrier 1, carrier 2, and carrier 3, i.e., transmit PDCP PDU1 in the RLC logical channel 1 on at least one of carrier 1, carrier 2, and carrier 3, and similarly, select a carrier for transmitting PDCP PDU1 in the RLC logical channel 2 among carrier 4, carrier 5, and carrier 6, i.e., transmit PDCP PDU1 in the RLC logical channel 2 on at least one of carrier 4, carrier 5, and carrier 6.

Optionally, in another possible implementation, indication information of each logical channel indicates an ID of a logical channel. Indication information of the RLC logical channel 1 in FIG. 3 may indicate LC2, for the RCL logical channel 2, and indication information of the RLC logical channel 2 may indicate LC1, for the RCL logical channel 1, that is, the RLC logical channel 1 and the RLC logical channel 2 are used for transmitting duplicated data. Therefore, the device for transmitting data may schedule duplicated data carried in the RLC logical channel 1 and the RCL logical channel 2 to be transmitted on different carriers. For example, the duplicated data carried in the RLC logical channel 1 and the RCL logical channel 2 may be scheduled to be transmitted on carrier 1 and carrier 2 respectively.

Method implementations of the present disclosure are described in detail above with reference to FIGS. 2 to 3, apparatus implementations of the present disclosure are described in detail below with reference to FIGS. 4 to 5. It should be understood that the apparatus implementations and the method implementations correspond to each other, and similar descriptions may be referred to in the method implementations.

Figure 4:
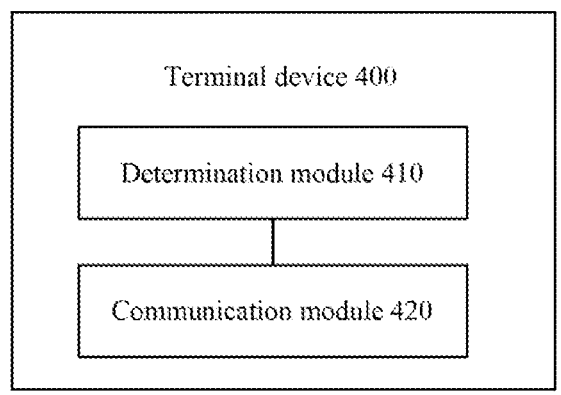
FIG. 4 is a schematic block diagram of a device for transmitting data according to an implementation of the present disclosure.

FIG. 4 is a schematic block diagram of a device 400 for transmitting data according to an implementation of the present disclosure. As shown in FIG. 4, the terminal device 400 includes a determination module 410 and a communication module 420.

The determination module 410 is used for determining a plurality of carriers or carrier groups for transmitting duplicated data according to a plurality of logical channels for carrying the duplicated data, herein at least two logical channels in the plurality of logical channels correspond to different carriers or carrier groups for transmitting the duplicated data.

The communication module 420 is used for transmitting the duplicated data carried in the plurality of logical channels respectively by using the plurality of carriers or carrier groups.

Optionally, in some implementations, the determination module 410 is specifically used for: determining the plurality of carriers or carrier groups according to respective indication information of each of the plurality of logical channels.

Optionally, in some implementations, the respective indication information corresponding to each logical channel is included in an indication field of logical channel configuration information corresponding to the each logical channel.

Optionally, in some implementations, the logical channel configuration information corresponding to each logical channel is a radio resource control (RRC) information element of the each logical channel, and the RRC information element of the each logical channel is used for configuring channel parameters of the each logical channel.

Optionally, in some implementations, the indication information includes first indication information corresponding to a first logical channel of the plurality of logical channels, and the determination module 410 is specifically used for: determining that a first carrier corresponding to a carrier ID of one carrier or a first carrier group corresponding to a carrier ID of a group of carriers indicated by the first indication information is a carrier or a carrier group for transmitting the duplicated data carried in the first logical channel.

The communication module 420 is specifically used for: transmitting the duplicated data carried in the first logical channel by using the first carrier or part or all of carriers in the first carrier group.

Optionally, in some implementations, the indication information includes second indication information corresponding to a second logical channel of the plurality of logical channels, the second indication information is identity information of other logical channels than the second logical channel in the plurality of logical channels, and the determination module 410 is specifically used for: determining that the duplicated data carried in the second logical channel and the other logical channels respectively correspond to different carriers or carrier groups according to the second indication information.

The communication module 420 is specifically used for: transmitting the duplicated data carried in the second logical channel and the other logical channels respectively by using the different carriers or carrier groups.

Optionally, in some implementations, the indication information includes third indication information corresponding to a third logical channel of the plurality of logical channels, the third indication information is used for indicating whether the duplicated data is carried in the third logical channel. The determination module 410 is specifically used for: determining that the duplicated data carried in the third logical channel and a fourth logical channel respectively correspond to different carriers or carrier groups if the third indication information indicates that the duplicated data is carried and fourth indication information corresponding to the fourth logical channel indicates that the duplicated data is carried.

The communication module is specifically used for: transmitting the duplicated data carried in the third logical channel and the fourth logical channel respectively by using the different carriers or carrier groups.

Optionally, in some implementations, the determination module 410 is specifically used for: determining that there is an indication field including the indication information in logical channel configuration information of each logical channel.

Optionally, in some implementations, the determination module 410 is specifically used for: determining a plurality of media access control (MAC) entities according to the plurality of logical channels and a first correspondence relationship, wherein the first correspondence relationship is a correspondence relationship between logical channels and MAC entities, and the plurality of logical channels and the plurality of MAC entities correspond one to one; determining the plurality of carriers or carrier groups according to the plurality of MAC entities and a second correspondence relationship, wherein the second correspondence relationship is a correspondence relationship between MAC entities and carriers or carrier groups, and the plurality of MAC entities and the plurality of carriers or carrier groups correspond one to one.

Optionally, in some implementations, the first correspondence relationship is preconfigured by a high layer signaling.

Optionally, in some implementations, the duplicated data is duplicated data obtained by duplicating the same packet data convergence protocol (PDCP) protocol data unit (PDU) by a PDCP split carrier.

Optionally, in some implementations, carrying the duplicated data on the plurality of logical channels is preconfigured by a higher layer signaling.

Optionally, in some implementations, the high layer signaling is a radio resource control (RRC) signaling.

Specifically, the terminal device 400 may correspond to a device for transmitting data in the method 200 for transmitting data according to an implementation of the present disclosure, and the device 400 may include entity units for executing a method executed by the device for transmitting data in the method 200 in FIG. 2. Moreover, various entity units in the device 400 and the other operations and/or functions described above are respectively for implementing the corresponding flows of the method 200 in FIG. 2, and will not be repeated here for the sake of brevity.

Figure 5:
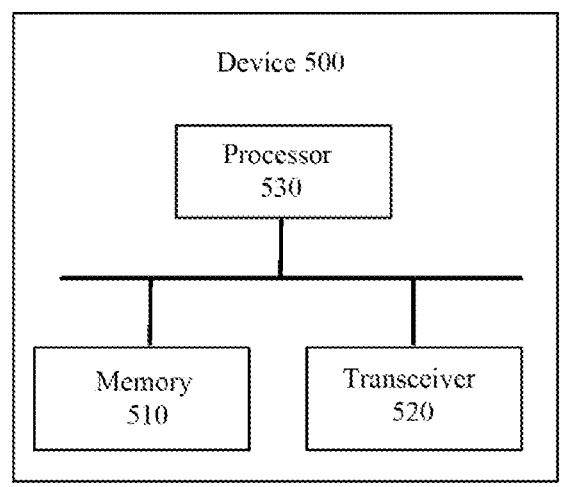
FIG. 5 is a schematic block diagram of a device for transmitting data according to another implementation of the present disclosure.

FIG. 5 is a schematic block diagram of a terminal device according to an implementation of the present disclosure. The terminal device 500 of FIG. 5 includes a memory 510 for storing a program, a transceiver 520, and a processor 530 for executing the program. When the program is executed, the processor 530 transmits and receives signals through the transceiver 520 and completes operations in the foregoing method implementations.

Specifically, the processor 530 is used for determining a plurality of carriers or carrier groups for transmitting duplicated data according to a plurality of logical channels for carrying the duplicated data, wherein at least two logical channels in the plurality of logical channels correspond to different carriers or carrier groups for transmitting the duplicated data.

The transceiver 520 is used for transmitting the duplicated data carried in the plurality of logical channels respectively by using the plurality of carriers or carrier groups.

Optionally, in some implementations, the processor 530 is specifically used for: determining the plurality of carriers or carrier groups according to respective indication information of each of the plurality of logical channels.

Optionally, in some implementations, the respective indication information corresponding to each logical channel is included in an indication field of logical channel configuration information corresponding to the each logical channel.

Optionally, in some implementations, the logical channel configuration information corresponding to each logical channel is a radio resource control (RRC) information element of the each logical channel, and the RRC information element of the each logical channel is used for configuring channel parameters of the each logical channel.

Optionally, in some implementations, the indication information includes first indication information corresponding to a first logical channel of the plurality of logical channels, and the processor 530 is specifically used for: determining that a first carrier corresponding to a carrier ID of one carrier or a first carrier group corresponding to a carrier ID of a group of carriers indicated by the first indication information is a carrier or a carrier group for transmitting the duplicated data carried in the first logical channel.

The transceiver 520 is specifically used for: transmitting the duplicated data carried in the first logical channel by using the first carrier or part or all of carriers in the first carrier group.

Optionally, in some implementations, the indication information includes second indication information corresponding to a second logical channel of the plurality of logical channels, the second indication information is identity information of other logical channels than the second logical channel in the plurality of logical channels. The processor 530 is specifically used for: determining that the duplicated data carried in the second logical channel and the other logical channels respectively correspond to different carriers or carrier groups according to the second indication information.

The transceiver 520 is specifically used for: transmitting the duplicated data carried in the second logical channel and the other logical channels respectively by using the different carriers or carrier groups.

Optionally, in some implementations, the indication information includes third indication information corresponding to a third logical channel of the plurality of logical channels, the third indication information is used for indicating whether the duplicated data is carried in the third logical channel, and the processor 530 is specifically used for: determining that the duplicated data carried in the third logical channel and a fourth logical channel respectively correspond to different carriers or carrier groups if the third indication information indicates that the duplicated data is carried and fourth indication information corresponding to the fourth logical channel indicates that the duplicated data is carried.

The transceiver is specifically used for: transmitting the duplicated data carried in the third logical channel and the fourth logical channel respectively by using the different carriers or carrier groups.

Optionally, in some implementations, the processor 530 is specifically used for: determining that there is an indication field including the indication information in logical channel configuration information of each logical channel.

Optionally, in some implementations, the processor 530 is specifically used for: determining a plurality of media access control (MAC) entities according to the plurality of logical channels and a first correspondence relationship, wherein the first correspondence relationship is a correspondence relationship between logical channels and MAC entities, and the plurality of logical channels and the plurality of MAC entities correspond one to one; determining the plurality of carriers or carrier groups according to the plurality of MAC entities and a second correspondence relationship, wherein the second correspondence relationship is a correspondence relationship between MAC entities and carriers or carrier groups, and the plurality of MAC entities and the plurality of carriers or carrier groups correspond one to one.

Optionally, in some implementations, the first correspondence relationship is preconfigured by a high layer signaling.

Optionally, in some implementations, the duplicated data is duplicated data obtained by duplicating the same packet data convergence protocol (PDCP) protocol data unit (PDU) by a PDCP split carrier.

Optionally, in some implementations, carrying the duplicated data on the plurality of logical channels is preconfigured by a higher layer signaling.

Optionally, in some implementations, the high layer signaling is a radio resource control (RRC) signaling.

It should be understood that, in an implementation of the present disclosure, the processor 530 may be a central processing unit (CPU), or the processor 530 may be other general purpose processor, a digital signal processor (DSP), an application specific integrated circuit (ASIC), a field programmable gate array (FPGA), or other programmable logic device, a discrete gate or a transistor logic device, or a discrete hardware component, etc. The general purpose processor may be a microprocessor, or the processor may be any conventional processor or the like.

The memory 510 may include a read only memory and a random access memory and provide instructions and data to the processor 530. A portion of memory 510 may also include a non-volatile random access memory. For example, the memory 510 may also store device type information.

In an implementation process, the acts of the methods described above may be accomplished by integrated logic circuits of hardware in the processor 530 or instructions in a form of software. The acts of the method disclosed in connection with the implementation of the present disclosure may be directly embodied to be completed by an execution of a hardware processor or by a combination of hardware and software modules in a processor. The software modules may be located in typical storage medium in the art, such as a random access memory, flash memory, read-only memory, programmable read-only memory or electrically erasable programmable memory, or register. The storage medium is located in the memory, and the processor 530 reads the information in the memory and accomplishes the acts of the method with its hardware. In order to avoid repetition, it will not be described in detail here.

In a specific implementation, the communication module 410 in FIG. 4 may be implemented by the processor 530 of FIG. 5, and the communication module 420 in FIG. 4 may be implemented by the transceiver 520 of FIG. 5.

Those of ordinary skill in the art will recognize that the exemplary elements and algorithm acts described in connection with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, a plurality of units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over a plurality of network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The storage medium includes U disk, mobile hard disk, read-only memory (ROM), random access memory (RAM), magnetic disk or optical disk, and other medium capable of storing program codes.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for transmitting data, comprising:
   determining a plurality of carriers or carrier groups for transmitting duplicated data according to a plurality of logical channels for carrying the duplicated data, wherein at least two logical channels in the plurality of logical channels correspond to different carriers or carrier groups for transmitting the duplicated data;
   transmitting the duplicated data carried in the plurality of logical channels respectively on the plurality of carriers or carrier groups;
   wherein in the plurality of logical channels, different logical channels correspond to different media access control (MAC) entities;
   wherein at least two logical channels in the plurality of logical channels corresponding to different carriers or carrier groups for transmitting the duplicated data comprises: in the MAC entities corresponding to the plurality of logical channels, different MAC entities correspond to different carriers or carrier groups;

wherein determining the plurality of carriers or carrier groups for transmitting the duplicated data according to the plurality of logical channels for carrying the duplicated data comprises:

determining the plurality of carriers or carrier groups according to respective indication information of each of the plurality of logical channels;

wherein the indication information comprises first indication information corresponding to a first logical channel of the plurality of logical channels, and the first indication information indicates carrier identities (IDs) of a group of carriers; and wherein transmitting the duplicated data carried in the plurality of logical channels respectively on the plurality of carriers or carrier groups comprises:

transmitting the duplicated data carried in the first logical channel on part of carriers in the group of carriers.

2. The method according to claim 1, wherein determining a plurality of carriers or carrier groups for transmitting duplicated data according to a plurality of logical channels for carrying the duplicated data comprises:

determining a plurality of MAC entities corresponding to the plurality of logical channels according to the plurality of logical channels carrying the duplicated data and a correspondence relationship between the logical channels and the MAC entities, and determining a plurality of carriers or carrier groups corresponding to the plurality of MAC entities;

wherein the correspondence relationship between the logical channels and the MAC entities is configured by a radio resource control (RRC) signaling.

3. The method according to claim 1, wherein the respective indication information of each logical channel is comprised in an indication field of respective logical channel configuration information of the each logical channel.

4. The method according to claim 3, wherein the respective logical channel configuration information of the each logical channel is a respective radio resource control (RRC) information element of the each logical channel, and the RRC information element of the each logical channel is used for configuring channel parameters of the each logical channel.

5. The method according to claim 1, wherein determining the plurality of carriers or carrier groups for transmitting the duplicated data according to the plurality of logical channels for carrying the duplicated data comprises:

determining a plurality of MAC entities according to the plurality of logical channels and a first correspondence relationship, wherein the first correspondence relationship is a correspondence relationship between logical channels and MAC entities, and the plurality of logical channels and the plurality of MAC entities correspond one to one; and determining the plurality of carriers or carrier groups according to the plurality of MAC entities and a second correspondence relationship, wherein the second correspondence relationship is a correspondence relationship between MAC entities and carriers or carrier groups, and the plurality of MAC entities and the plurality of carriers or carrier groups correspond one to one.

6. The method according to claim 1, wherein the duplicated data is duplicated data obtained by duplicating a same one packet data convergence protocol (PDCP) protocol data unit (PDU) by a PDCP split carrier.

7. The method according to claim 1, wherein carrying the duplicated data on the plurality of logical channels is preconfigured by a higher layer signaling.

8. The method according to claim 7, wherein the high layer signaling is a radio resource control (RRC) signaling.

9. A device for transmitting data, comprising a processor, a memory and a transceiver, the memory is configured to store a program executable by the processor, the transceiver is configured to communicate with other devices under control of the processor, and the processor is configured to execute the program to:

determine a plurality of carriers or carrier groups for transmitting duplicated data according to a plurality of logical channels for carrying the duplicated data, wherein at least two logical channels in the plurality of logical channels correspond to different carriers or carrier groups for transmitting the duplicated data; and transmit, through the transceiver, the duplicated data carried in the plurality of logical channels respectively on the plurality of carriers or carrier groups;

wherein in the plurality of logical channels, different logical channels correspond to different media access control (MAC) entities;

wherein at least two logical channels in the plurality of logical channels corresponding to different carriers or carrier groups for transmitting the duplicated data comprises: in the MAC entities corresponding to the plurality of logical channels, different MAC entities correspond to different carriers or carrier groups;

wherein determine the plurality of carriers or carrier groups for transmitting the duplicated data according to the plurality of logical channels for carrying the duplicated data comprises:

determine the plurality of carriers or carrier groups according to respective indication information of each of the plurality of logical channels;

wherein the indication information comprises first indication information corresponding to a first logical channel of the plurality of logical channels, and the first indication information indicates carrier identities (IDs) of a group of carriers; and wherein transmit, through the transceiver, the duplicated data carried in the plurality of logical channels respectively on the plurality of carriers or carrier groups comprises:

transmit, through the transceiver, the duplicated data carried in the first logical channel on part of carriers in the group of carriers.

10. The device according to claim 9, wherein the processor is configured to execute the program to:

determine a plurality of MAC entities corresponding to the plurality of logical channels according to the plurality of logical channels carrying the duplicated data and a correspondence relationship between the logical channels and the MAC entities, and determine a plurality of carriers or carrier groups corresponding to the plurality of MAC entities;

wherein the correspondence relationship between the logical channels and the MAC entities is configured by a radio resource control (RRC) signaling.

11. The device according to claim 9, the respective indication information of each logical channel is comprised in an indication field of respective logical channel configuration information of the each logical channel.

12. The device according to claim 11, wherein the respective logical channel configuration information of the each logical channel is a respective radio resource control (RRC) information element of the each logical channel, and the RRC information element of the each logical channel is used for configuring channel parameters of the each logical channel.

13. The device according to claim 9, wherein the processor is configured to execute the program to:
  determine a plurality of MAC entities according to the plurality of logical channels and a first correspondence relationship, wherein the first correspondence relationship is a correspondence relationship between logical channels and MAC entities, and the plurality of logical channels and the plurality of MAC entities correspond one to one;
  determine the plurality of carriers or carrier groups according to the plurality of MAC entities and a second correspondence relationship, wherein the second correspondence relationship is a correspondence relationship between MAC entities and carriers or carrier groups, and the plurality of MAC entities and the plurality of carriers or carrier groups correspond one to one.

14. The device according to claim 9, wherein the duplicated data is duplicated data obtained by duplicating a same one packet data convergence protocol (PDCP) protocol data unit (PDU) by a PDCP split carrier.

15. The device according to claim 9, wherein carrying the duplicated data on the plurality of logical channels is preconfigured by a higher layer signaling.

16. A non-transitory computer-readable storage, storing programs executable by a computer, the programs, when being executed, cause the computer to:
  determine a plurality of carriers or carrier groups for transmitting duplicated data according to a plurality of logical channels for carrying the duplicated data, wherein at least two logical channels in the plurality of logical channels correspond to different carriers or carrier groups for transmitting the duplicated data; and
  transmit the duplicated data carried in the plurality of logical channels respectively on the plurality of carriers or carrier groups;
wherein in the plurality of logical channels, different logical channels correspond to different media access control (MAC) entities;
wherein at least two logical channels in the plurality of logical channels corresponding to different carriers or carrier groups for transmitting the duplicated data comprises: in the MAC entities corresponding to the plurality of logical channels, different MAC entities correspond to different carriers or carrier groups;
wherein determine the plurality of carriers or carrier groups for transmitting the duplicated data according to the plurality of logical channels for carrying the duplicated data comprises:
  determine the plurality of carriers or carrier groups according to respective indication information of each of the plurality of logical channels;
wherein the indication information comprises first indication information corresponding to a first logical channel of the plurality of logical channels, and the first indication information indicates carrier identities (IDs) of a group of carriers; and
wherein transmit the duplicated data carried in the plurality of logical channels respectively on the plurality of carriers or carrier groups comprises:
  transmit the duplicated data carried in the first logical channel on part of carriers in the group of carriers.

* * * * *